US012420520B2

(12) United States Patent
Ao

(10) Patent No.: US 12,420,520 B2
(45) Date of Patent: Sep. 23, 2025

(54) THREE-LAYERED CORE-SPUN WEBBING, AND SEAT COMPRISING WEBBING

(71) Applicant: JIAXING PORT QUANSHUN WEBBING CO.,LTD., Zhejiang (CN)

(72) Inventor: Yuehai Ao, Zhejiang (CN)

(73) Assignee: JIAXING PORT QUANSHUN WEBBING CO., LTD., Jiaxing (CN)

( * ) Notice: Subject to any disclaimer, the term of this patent is extended or adjusted under 35 U.S.C. 154(b) by 320 days.

(21) Appl. No.: 17/615,654

(22) PCT Filed: Mar. 20, 2020

(86) PCT No.: PCT/CN2020/080366
§ 371 (c)(1),
(2) Date: Dec. 1, 2021

(87) PCT Pub. No.: WO2020/253291
PCT Pub. Date: Dec. 24, 2020

(65) Prior Publication Data
US 2022/0332080 A1    Oct. 20, 2022

(30) Foreign Application Priority Data
Jun. 18, 2019   (CN) .......................... 201920917509.0

(51) Int. Cl.
*B32B 1/08*     (2006.01)
*B32B 5/02*     (2006.01)
(Continued)

(52) U.S. Cl.
CPC ................ *B32B 1/08* (2013.01); *B32B 5/022* (2013.01); *B32B 5/024* (2013.01); *B32B 5/12* (2013.01);
(Continued)

(58) Field of Classification Search
CPC . F16L 58/16; B32B 1/08; B32B 5/022; B32B 5/024; B32B 5/12; B32B 27/12;
(Continued)

(56) References Cited

U.S. PATENT DOCUMENTS 2,828,798 A * 4/1958 Hopkins ................. F16L 58/16
156/305

FOREIGN PATENT DOCUMENTS

CA          2200736      *  2/1997
CN        200959710      * 10/2007
(Continued)

OTHER PUBLICATIONS

International Search Report for PCT/CN2020/080366 mailed on May 29, 2020.

*Primary Examiner* — Camie S Thompson
(74) *Attorney, Agent, or Firm* — Birch, Stewart, Kolasch & Birch, LLP

(57) ABSTRACT

Disclosed are a piece of three-layer core-spun webbing, and a seat comprising the webbing. The webbing comprises a woven layer and an inner core, wherein the inner core comprises a filling layer and an interlayer, the interlayer is filled with the filling layer, and an outer surface of the interlayer is in contact with an inner surface of the woven layer. The webbing of the invention has a high tensile strength and a good elasticity, can quickly dry, and is round.

10 Claims, 2 Drawing Sheets

(51) Int. Cl.
*B32B 5/12* (2006.01)
*B32B 27/12* (2006.01)
*B32B 27/30* (2006.01)
*B32B 27/32* (2006.01)

(52) U.S. Cl.
CPC ............ *B32B 27/12* (2013.01); *B32B 27/304* (2013.01); *B32B 27/32* (2013.01); *B32B 2250/03* (2013.01); *B32B 2255/02* (2013.01); *B32B 2307/73* (2013.01)

(58) Field of Classification Search
CPC ....... B32B 27/304; B32B 27/32; B32B 27/36; B32B 27/30; B32B 27/08; B32B 27/02; B32B 27/34; B32B 2250/02; B32B 2262/0245; B32B 2262/0253; B32B 2262/0276; B32B 2262/261; B32B 2307/7265; B32B 2307/73; B32B 2479/00; B32B 2471/02; B32B 2471/04; B32B 23/02; B32B 23/08; B32B 9/02; B32B 9/04; C08L 27/06; D03D 15/587; D03D 15/56; D03D 15/225; D03D 15/283; D03D 5/12; D03D 5/09; C08K 13/02; B65B 11/00
USPC ......................................................... 442/189
See application file for complete search history.

(56) References Cited

FOREIGN PATENT DOCUMENTS

| | | | |
|---|---|---|---|
| CN | 201302841 | * | 9/2009 |
| CN | 202072844 | U | 12/2011 |
| CN | 202099464 | U | 1/2012 |
| CN | 103469652 | A | 12/2013 |
| CN | 106486204 | * | 3/2017 |
| CN | 110757929 | A | 2/2020 |

* cited by examiner

THREE-LAYERED CORE-SPUN WEBBING, AND SEAT COMPRISING WEBBING

TECHNICAL FIELD

The invention relates to the textile field, in particular to a three-layer core-spun webbing and a seat containing the webbing.

TECHNICAL BACKGROUND

Core-spun webbing is more and more widely used in the field of household and outdoor products. The core of existing core-spun webbing in the market is usually arranged in parallel with several cotton slivers or strings.

SUMMARY OF THE INVENTION

Technical Matters

When the inner core of the webbing in the background technology is exposed, the slivers or strings are easily pulled out one by one, which affects the stereoscopic effect of the webbing during use. In addition, the core-spun webbing is not easy to dry after being soaked with water, or the outer surface of the webbing is dry, but the inner core is still wet, which leads to mildew of the webbing and further reduces the service life of the webbing.

Solution to the Problems

Technical Solution

The invention relates to a three-layer core-spun webbing, which features high strength, good elasticity, easy to dry after wet and good stereospecificity.

The invention is realized by the following technical solution:

The invention provides a three-layer core-spun webbing comprising a woven layer and an inner core, wherein the inner core comprises a filling layer and an interlayer. The filling layer is filled in the interlayer, whose outer surface is in contact with the inner surface of the woven layer. Through the technical solution, the filling layer makes the inner core fuller and more three-dimensional, and the woven layer at the outermost layer can increase the hand feeling; the multilayer design of the webbing increases its tensile breaking strength, which is better in the same cross-sectional area.

As a further improvement of the invention, the outer surface of the interlayer is the rough surface. According to the aforesaid technical solution, the rough surface increases the friction between the woven layer and the interlayer, making the two entangle more firmly, and thus the inner core is not easy to detached from the woven layer.

As a further improvement of the invention, the interlayer is made of plastic material. The plastic in this technical solution boasts low cost, simple processing and easy molding.

As a further improvement of the invention, the interlayer is a PVC hollow circular pipe, which, in this technical solution has waterproof, mildew-proof and oil-proof effects, making oil or water unable to enter the inner core; thereby the wet webbing dries quickly to prevent mildew inside the webbing.

As a further improvement of the invention, the filling layer is polyester or polypropylene filament and yarn. In this technical solution, the higher strength and elastic resilience of the filling layer of polyester or polypropylene enhance the firmness, elasticity and strength of the inner core, thereby enhancing the strength and elasticity of the webbing.

As a further improvement of the invention, the inner core is circular and strip shaped. In the above technical solution, the circular-strip inner core can better support the woven layer, and the inner core contains infilling, making the webbing fuller, more resilient, and three-dimensional.

As a further improvement of the invention, the woven layer adopts yarns or filaments of polyester or acrylic or polypropylene or nylon materials. In this technical solution, the woven layer is on the outer surface of the webbing, which is the contact surface that has the most contact and friction with other objects, and the polyester or acrylic or polypropylene or nylon material has good wear resistance and high strength, thus prolonging the service life of the webbing.

As a further improvement of the invention, the woven layer also comprises several thermal fuses which are distributed inside and outside the woven layer. In this technical solution, the yarns or filaments of the woven layer are all adhered by the thermal fuses, thus overcoming the deformation problem commonly existing in the current webbing, and making the shape of the woven layer and the knitting tightness always maintain the initial state; for the outer side of the woven layer, the woven layer and the inner core can be adhered by the thermal fuses to fix the relative position between the woven layer and the inner core, and further increase the cohesion fastness of the woven layer and the inner core, thereby enhancing the strength of the webbing.

As a further improvement of the invention, a waterproof film is attached to the outer surface of the woven layer. In this technical solution, the surface of the webbing has a waterproof function.

The invention provides a seat, whose plane is made of the three-layer core-spun webbing. In this technical solution, the three-layer core-spun webbing is soft and easy to bend, and has good plasticity; the plane of the seat includes the sitting surface and the back surface, etc., and the seat surface features stiffness and smoothness, good hand feeling and portability.

Beneficial Effects of the Invention

Beneficial Effects

In this invention, the three-layer core-spun webbing and the seat containing the webbing, the interlayer is made of PVC hollow circular pipes with waterproof, mildew-proof and oil-proof effects, making only the woven layer of the webbing wet even if it being wet or oil-stained, but the inner core not to be penetrated. Since it is easy to dry by wind and sun or deoil with detergent, the webbing will not mildew and has a long service life. Both the filling layer and the woven layer are made of high-strength materials, which can improve the strength and wear resistance of the webbing, and further improve the service life of the webbing. The fused thermal fuse is used to adhere the adjacent warp and weft of the woven layer and the adjacent warp and warp, weft and weft to solve the deformation of the woven layer and prevent the woven layer from relaxing, and adhere the woven layer to the interlayer, further prevent the inner core from separating from the woven layer, thereby making the woven belt more stereoscopic and elastic.

To make the above and other objects, features and advantages of the invention more obvious and easy to understand, the following is a detailed description of the preferred embodiments with reference to the attached figures.

BRIEF DESCRIPTION OF THE ATTACHED FIGURES

Description of the Attached Figures

In this Figure: 1. Woven layer; 2. Inner core; 21. Filling layer; 22. Interlayer

INVENTION EMBODIMENTS

Implementation Method of the Invention

To further explain the adopted technical means and efficacy to achieve the intended purpose of the invention, the detailed description of the specific implementation method, structure, features and efficacy according to the invention is as follows, combined with the attached figures and preferred embodiments.

In the invention, the extrusion port of the PVC extender is the front side and the feed port of the extruder is the rear side.

Embodiment 1

Figure 1:
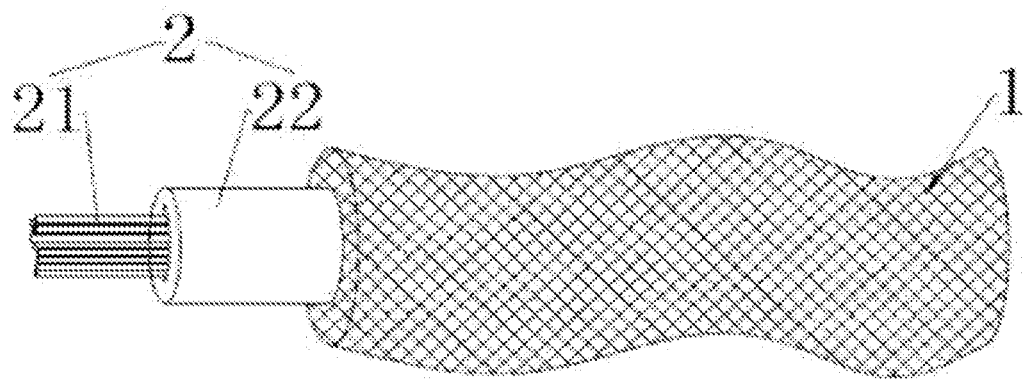
FIG. 1 is a schematic structural diagram of a three-layer core-spun webbing provided in Embodiment 1 of the invention.
Figure 2:
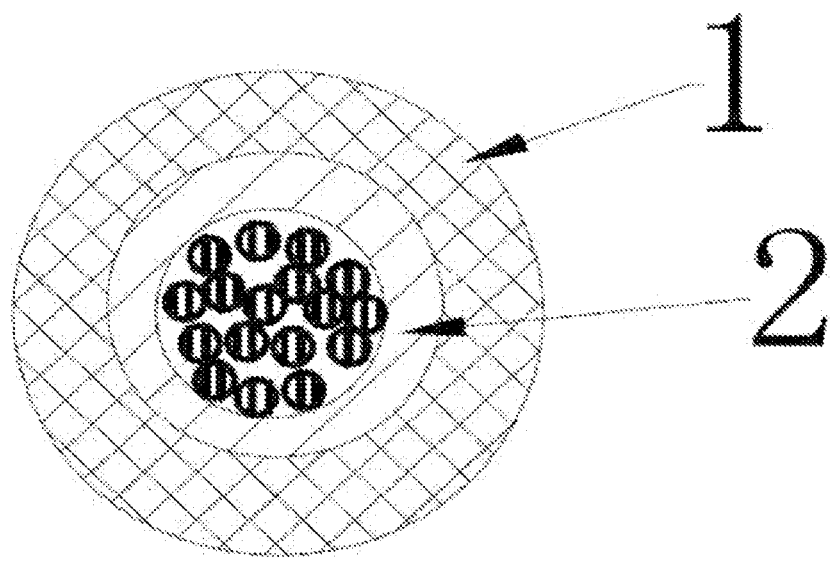
FIG. 2 is a cross section of the webbing provided in Embodiment 1 of the invention.
Figure 3:
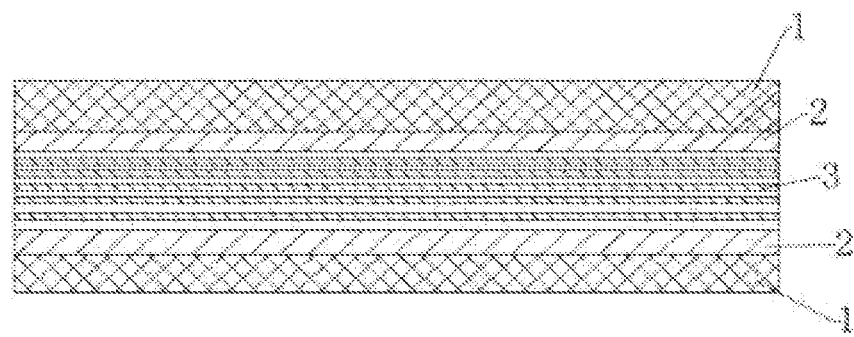
FIG. 3 is a sectional drawing of the webbing provided in Embodiment 1 of the invention.

As shown in FIG. 1-3, the three-layer core-spun webbing of the invention comprises the woven layer 1 and the inner core 2, wherein the woven layer 1 is wrapped outside the inner core 2, which comprises the filling layer 21 and the interlayer 22, wherein the filling layer 21 is filled inside the interlayer 22, and the outer surface of the interlayer 22 contacts the inner surface of the woven layer 1.

The interlayer 22 of the invention is made of plastic, specifically, a PVC hollow circular pipe, and the filling layer 21 is polyester or polypropylene filament and yarn. The PVC hollow circular pipe is produced and the filling layer 21 is filled into the interlayer 22 in the following way:

As shown in FIG. 1, the inner core 2, the yarn holder of the filaments and yarns used for the filling layer 21, is placed at the rear side of the inlet of the PVC extruder, the filaments and yarns of polyester or polypropylene pass through the central hole of the extrusion die of the extender, and the molten PVC is extruded through the extrusion die, thus forming a circular strip-shaped object with PVC hollow circular pipe outside and filaments and yarns of polyester or polypropylene filled inside. The filling layer 21 is in a bundle shape in the interlayer 22, that is, one filament and yarn of polyester or polypropylene are arranged in parallel along the length direction of the hollow circular pipe. PVC hollow round pipe has the waterproof, mildew-proof and oil-proof effects, which enhance the tensile breaking strength of the inner core 2 to make the interlayer 22 more expandable, stereoscopic, soft and elastic. The filling layer 21 can be filled during the processing of the interlayer 22, and the residual heat of the interlayer 22 and the incompletely cured PVC inside it can stick the filling layer 21 to prevent the filling layer 21 from separating from the interlayer 22.

It is further explained that the filling layer 21 can be directly filled with soft ropes or other materials.

It is further explained that the warps and wefts of the woven layer 1 are made of yarns or filaments of polyester or acrylic or polypropylene or nylon, and the warps, wefts and inner core 2 are crossed and arranged on a circular knitting machine or a webbing weaving machine as required to weave into a three-layer core-spun webbing.

Specifically, in the production process of the interlayer 22, the PVC extrusion temperature falls in the range of 120-170° C., and the temperature of the PVC extruder should be lowered, preferably 120-140° C., enabling the outer surface of the PVC hollow circular pipe to form a rough hair surface. The friction between the interlayer 22 and the woven layer 1 is increased to increase the cohesion fastness between the two layers; thereby, the interlayer 22 is not easy to be pulled out from the woven layer 1.

Further, the outer surface of the PVC hollow circular pipe can be directly processed to be smooth.

Further, the size of the cavity in the interlayer 22 determines the amount of filaments and yarns filling the layer 21.

A seat, including sofa, chair, hanging chair, lounge chair, stool, bench, dining chair, booth, footstool and chair cushion, is formed by winding the above-mentioned webbing around the framework of the seat, and the aforesaid webbing can also be used to make side tables, coffee tables and dining tables. The winding surface formed by the webbing is stiff and full, stereoscopic, waterproof, oil-proof and mildew-proof, and portable.

The invention relates to a three-layer core-spun webbing and a seat containing the webbing, which comprises a woven layer 1 and an inner core 2, wherein the woven layer 1 is wrapped outside the inner core 2, which comprises a filling layer 21 and an interlayer 22. The interlayer 22 is a hollow circular pipe, and the filling layer 21 is filled in the interlayer 22. The webbing is made into the planes of the table and the seat. The infilling 22 enhances the expansion degree, tensile breaking strength and elasticity of the inner core 2. The interlayer 22 is made of PVC material with good waterproof, mildew-proof and oil-proof effect, which only makes the woven layer wet after the webbing is exposed to rain water, and the webbing is easily dried due to outdoor wind and sun exposure or rapid indoor air circulation, thus preventing the webbing from mildewing and further prolonging the service life of the webbing. It is suitable for furniture and outdoor products such as tables, chairs, floor mats and carpets.

Embodiment 2

In this embodiment, in addition to the above materials, several thermal fuses are added to the warps and wefts of the woven layer 1, and the thermal fuses account for 2%-91% of the total fiber of the webbing. The thermal fuses can be nylon thermal fuses or polyester thermal fuses, which are evenly interwoven at the inner and outer sides of the woven layer 1. The woven webbing undergoes waterproof treatment, which adopts soaking and drying process. In the process, firstly, the webbing is immersed in waterproof agent and then dried to remove excess water, with the drying temperature being preferably 80-130° C., and the webbing is then baked at high temperature, preferably 140-180° C. Immersing the webbing into the waterproof agent makes the waterproof agent evenly distributed on the surface of the webbing, and the dried waterproof agent is attached to the surface of the webbing to form a waterproof film on the surface of the webbing via high-temperature baking. In this way, the surface of the webbing has good waterproof property. In the process of high-temperature baking, the thermal fuses melt, and for the outer side of the woven layer 1, both the yarns or filaments of the warps and wefts of the inner side of the woven layer 1, are adhered together by the thermal fuses to overcome the deformation commonly existing in the current webbing, making the shape and knitting tightness of the woven layer 1 always maintain the initial state. For the outer side of the woven layer 1, the woven layer 1 and the inner core 2 can be adhered to fix the relative position between the woven layer 1 and the inner core 2, thereby further enhancing the fastness of the woven layer 1 and the inner core 2.

What has been described above is only the preferred embodiment of the invention, and it does not limit the invention in any form. Although the invention has been disclosed as the preferred embodiment, it is not used to limit the invention. Any technician in the art may make some changes or modification with equivalent changes to generate equivalent embodiments by using the disclosed technical contents without departing from the scope of the technical solution of the invention. However, any simple modification, equivalent change or modification made to the above embodiment in line with the technical substance of the invention without deviating from the content of the technical solution of the invention shall still fall within the scope of the technical solution of the invention.

INDUSTRIAL PRACTICABILITY

The invention provides a three-layer core-spun webbing and a seat comprising the webbing, wherein the webbing comprises a woven layer 1 and an inner core 2. The woven layer 1 is wrapped outside the inner core 2, and the inner core 2 comprises a filling layer 21 and an interlayer 22, which is a hollow circular pipe, and the filling layer 21 is filled inside the interlayer 22. The webbing is made into the planes of the table and the seat. The infilling 22 enhances the expansion degree, tensile breaking strength and elasticity of the inner core 2. The interlayer 22 is made of PVC material with good waterproof, mildew-proof and oil-proof effects, which only causes the woven layer to be wet after the webbing is exposed to rain water, and makes the webbing very easy to dry due to outdoor wind and sun exposure or rapid indoor air circulation, thus preventing the webbing from mildewing and further prolonging the service life of the webbing. It is suitable for furniture and outdoor products such as tables, chairs, floor mats and carpets, and can be manufactured or used industrially, having industrial practicability.

The invention claimed is:

1. A three-layer core-spun webbing, comprising a woven layer and an inner core, wherein the inner core comprises a filling layer and an interlayer made of waterproof material, the filling layer is filled inside the interlayer, and the outer surface of the interlayer is in contact with an inner side of the woven layer,
wherein the filling layer is polyester or polypropylene filaments and yarns,
wherein the inner core is in a circular strip shape,
wherein the woven layer is made of yarns or filaments of polyester or acrylic or polypropylene or nylon materials, and
wherein an outer surface of the interlayer is a roughened surface.

2. The three-layer core-spun webbing stated in claim 1, wherein the interlayer is made of plastic material.

3. The three-layer core-spun webbing stated in claim 2, wherein the interlayer is a PVC hollow circular pipe.

4. A seat, wherein a surface of the seat is made of the three-layer core-spun webbing stated in claim 3.

5. The three-layer core-spun webbing stated in claim 1, wherein the interlayer is a PVC hollow circular pipe.

6. A seat, wherein a surface of the seat is made of the three-layer core-spun webbing stated in claim 4.

7. A seat, wherein a surface of the seat is made of the three-layer core-spun webbing stated in claim 1.

8. A three-layer core-spun webbing, comprising a woven layer and an inner core, wherein the inner core comprises a filling layer and an interlayer made of waterproof material, the filling layer is filled inside the interlayer, and the outer surface of the interlayer is in contact with an inner side of the woven layer,
wherein the filling layer is polyester or polypropylene filaments and yarns,
wherein the inner core is in a circular strip shape,
wherein the woven layer is made of yarns or filaments of polyester or acrylic or polypropylene or nylon materials, and
wherein the woven layer further contains several thermal fuses, which are distributed inside and outside the woven layer.

9. The three-layer core-spun webbing stated in claim 8, wherein a waterproof film is attached to an outer surface of the woven layer.

10. A three-layer core-spun webbing, comprising a woven layer and an inner core, wherein the inner core comprises a filling layer and an interlayer made of waterproof material, the filling layer is filled inside the interlayer, and the outer surface of the interlayer is in contact with an inner side of the woven layer,
wherein the filling layer is polyester or polypropylene filaments and yarns,
wherein the inner core is in a circular strip shape,
wherein the woven layer is made of yarns or filaments of polyester or acrylic or polypropylene or nylon materials, and
wherein a waterproof film is attached to an outer surface of the woven layer.

* * * * *